United States Patent [19]

Sawai

[11] Patent Number: 5,522,484

[45] Date of Patent: Jun. 4, 1996

[54] VARIABLE DAMPING FORCE HYDRAULIC SHOCK ABSORBER

[75] Inventor: Seiji Sawai, Iwata, Japan

[73] Assignee: Yamaha Hatsudoki Kabushiki Kaisha, Iwata, Japan

[21] Appl. No.: 307,912

[22] Filed: Sep. 16, 1994

[51] Int. Cl.⁶ .................................................. F16F 9/46
[52] U.S. Cl. .......................................... 188/299; 188/319
[58] Field of Search ...................................... 188/299, 317, 188/319, 312, 322.15, 322.22; 280/707

[56] References Cited

U.S. PATENT DOCUMENTS

| | | | |
|---|---|---|---|
| 2,349,244 | 5/1944 | Brown | 188/312 |
| 2,931,035 | 3/1960 | Reinhard | 188/312 |
| 3,158,232 | 11/1964 | Doetsch | 188/312 |
| 4,954,799 | 9/1990 | Kumar | 335/236 |
| 4,986,392 | 1/1991 | Komossa | 188/319 |

FOREIGN PATENT DOCUMENTS

| | | |
|---|---|---|
| 4033190C1 | 10/1990 | Denmark . |
| 0186167A3 | 7/1986 | European Pat. Off. . |
| 0291825A1 | 11/1988 | European Pat. Off. . |
| 0403447A1 | 12/1990 | European Pat. Off. . |
| 0405123A2 | 6/1989 | Germany . |
| 58-221033 | 12/1983 | Japan . |
| 4-78338A | 3/1992 | Japan . |
| 4-78338 | 4/1992 | Japan . |
| 5-26050 | 5/1993 | Japan . |
| 2000883A | 7/1977 | United Kingdom . |

Primary Examiner—Robert J. Oberleitner
Assistant Examiner—C. T. Bartz
Attorney, Agent, or Firm—Knobbe, Martens, Olson & Bear

[57] ABSTRACT

A variable damping force hydraulic shock absorber has a solenoid driven control valve that controls the size of an opening to a control passage contained within the piston rod. The control passage allows fluid contained within the cylinder to bypass the resistance mechanism of the piston. The size of the opening to the control passage varies according to the movement of a control element within the hollow piston rod. The movement of the control element is controlled by the magnitude of the electrical current delivered to a solenoid driven control valve. The movement of the control element is aided by a compression spring located between the control element and an adjusting bolt. The damping force of the shock absorber is externally adjustable by turning the adjusting bolt located within one end of the piston rod.

17 Claims, 5 Drawing Sheets

VARIABLE DAMPING FORCE HYDRAULIC SHOCK ABSORBER

BACKGROUND OF THE INVENTION

This invention relates to a hydraulic shock absorber and more particularly to an improved variable damping force hydraulic shock absorber.

Conventional hydraulic shock absorbers are well known in the art. Conventional hydraulic shock absorbers include a piston that reciprocates within a hollow cylinder. The piston is fixed to one end of a piston rod and the piston is disposed within the internal space of the cylinder to divide the cylinder into first and second chambers. The chambers are typically filled with a fluid such as oil to resist the motion of the piston within the cylinder. The reciprocating movement of the piston is resisted because the fluid must flow through a resistance mechanism when flowing from one chamber to the other chamber. Typically, the resistance mechanism comprises throttle plates or check valves which control the damping of the shock absorber. The movement of the fluid through the resistance mechanism dissipates the input energy to the shock absorber by displacing the fluid through the resistance mechanism. The velocity of the reciprocating piston, which determines the amount of energy dissipated, is controlled by the amount of resistance to the fluid flow.

It has been recognized that the ability to change the damping characteristics of the hydraulic shock absorber is advantageous and desirable. Variable damping force hydraulic shock absorbers often include an additional fluid communicating path that bypasses the resistance mechanism of the shock absorber and connects the first and second fluid chambers of the shock absorber. The communicating path is often located within the piston rod and establishes an alternative fluid path of less resistance between the first and second chambers of the shock absorber. This fluid communication path decreases the damping of the shock absorber because the fluid flowing through the communicating path is not subject to the resistance mechanism of the shock absorber.

It is known to adjust the damping of the shock absorber by controlling the amount of fluid flowing through the communicating path. For example, Japanese unexamined patent publication Hei4-78338 discloses a conventional hydraulic shock absorber with a piston that reciprocates in a cylinder filled with fluid and a fluid communicating path located in the piston rod that connects the first and second fluid chambers. The fluid communicating path allows the fluid to bypass the resistance mechanism of the piston and this decreases the damping of the piston. The Japanese patent application also discloses mounting a solenoid driven control valve on the piston rod to vary the size of the opening to the fluid communicating path bored through the piston rod. The solenoid driven control valve includes a solenoid and a plunger, which are axially aligned with the opening to the communicating path. The movement of the plunger is controlled by the solenoid and the solenoid moves the plunger into and out of the opening to the communicating path to control the fluid flowing through the passage.

In further detail, the Japanese patent application discloses that when the solenoid is energized, the solenoid removes the plunger from the opening to the communicating path. This decreases the damping force of the shock absorber because the fluid flows through the communicating path and the fluid bypasses the resistance mechanism of the shock absorber. Alternatively, when the solenoid is deenergized, a spring pushes the plunger into the opening of the communicating path and this forces the fluid to flow through the resistance mechanism of the piston. Accordingly, the damping force of the shock absorber is comparatively greater. Thus, a variable damping force hydraulic shock absorber which allows larger and smaller damping forces to be obtained by energizing and deenergizing the solenoid driven control valve is known.

It is also known to adjust the damping force of the shock absorber by increasing or decreasing the amount of electrical current flowing to the solenoid. This allows the solenoid to move the plunger in small steps such that the size of the opening to the communicating path is gradually changed. Consequently, the damping force of the shock absorber is variously adjustable because the rate of fluid flow through the communicating path can be changed in small increments.

This proposed arrangement, however, can be improved upon because the damping characteristics of the adjustable shock absorbers can vary from unit to unit, especially when the shock absorbers are mass produced, The amount of damping force provided by variable damping force hydraulic shock absorbers varies because of the inherent variability and inconsistency of manufacturing process. The amount of damping may vary, for example, because of the different properties of the electric components, such as the solenoids, and the different shapes and sizes of the component parts used to construct the shock absorber.

It is, therefore, a principal object of this invention to provide an improved variable damping force hydraulic shock absorber.

It is desirable when producing variable damping force hydraulic shock absorbers to be able to adjust the amount of damping force provided by each shock absorber such that a uniform amount of damping is provided by each shock absorber. A consistent amount of damping force permits the shock absorbers to be interchangeable and a specific relationship between the magnitude of the electrical current supplied to the shock absorber and the amount of damping force provided by the shock absorber to be established. For any given amount of electrical current supplied to the adjustable shock absorber, the shock absorber should respond in a predictable manner to provide a specified amount of damping.

It has been proposed to supply a different amount of electrical current to each shock absorber to obtain a uniform amount of damping. This would permit each shock absorber to have a constant initial amount of damping and any additional electrical current supplied to the shock absorber would change the damping characteristics of the shock absorber. This proposal, however, requires a complex arrangement to supply various amounts of electrical current to the different shock absorbers to obtain a uniform amount of damping. Alternatively, the shock absorber must be disassembled and the internal components exchanged or adjusted to obtain the desired uniform amount of damping.

It is, therefore, a further object of this invention to provide a variable damping force hydraulic shock absorber that is externally adjustable to provide uniform damping.

SUMMARY OF THE INVENTION

The present invention is an improved variable damping force hydraulic shock absorber which includes a piston rod extending into the internal space of a cylinder. A piston is fixed to the piston rod to divide the internal space of the cylinder into first and second fluid chambers. A control passage located in the piston rod restricts the flow of fluid between the first and second fluid chambers upon the movement of the piston within the cylinder. A control element is movable within the piston rod to control the resistance to the flow of fluid through the control passage. The movement of the control element is regulated by a solenoid, which moves the control element between a first position when the solenoid is fully energized and a second position when the solenoid is not energized. An adjustable stop is also provided to set at least one of the positions of the control element. The positioning of the adjustable stop is mechanically adjustable external to the cylinder of the shock absorber.

The magnitude of the damping force of the shock absorber is adjustable to a predetermined amount by moving the adjusting stop within the piston rod. Moving the adjusting stop causes a corresponding movement of the control element within the piston rod. Significantly, this causes the fluid resistance of the control passage to vary, without requiring disassembly of the shock absorber or changing the amount of electrical current supplied to the solenoid driven control valve.

The stop can be adjusted external to the cylinder because the open end of the hollow piston rod provides access to the stop. A tool can be inserted into the open end of the hollow piston rod to engage the adjusting stop. The adjusting stop, which is preferably threadably connected to the interior of the piston rod, can then be rotated to move it within the piston rod. This allows the damping force to be varied externally of the shock absorber. This advantageously allows a uniform or predetermined amount of damping force to be obtained, and mass-produced variable damping force hydraulic shock absorbers may be quickly and easily adjusted to have uniform damping characteristics.

DETAILED DESCRIPTION OF THE PREFERRED EMBODIMENT OF THE INVENTION

Figure 1:
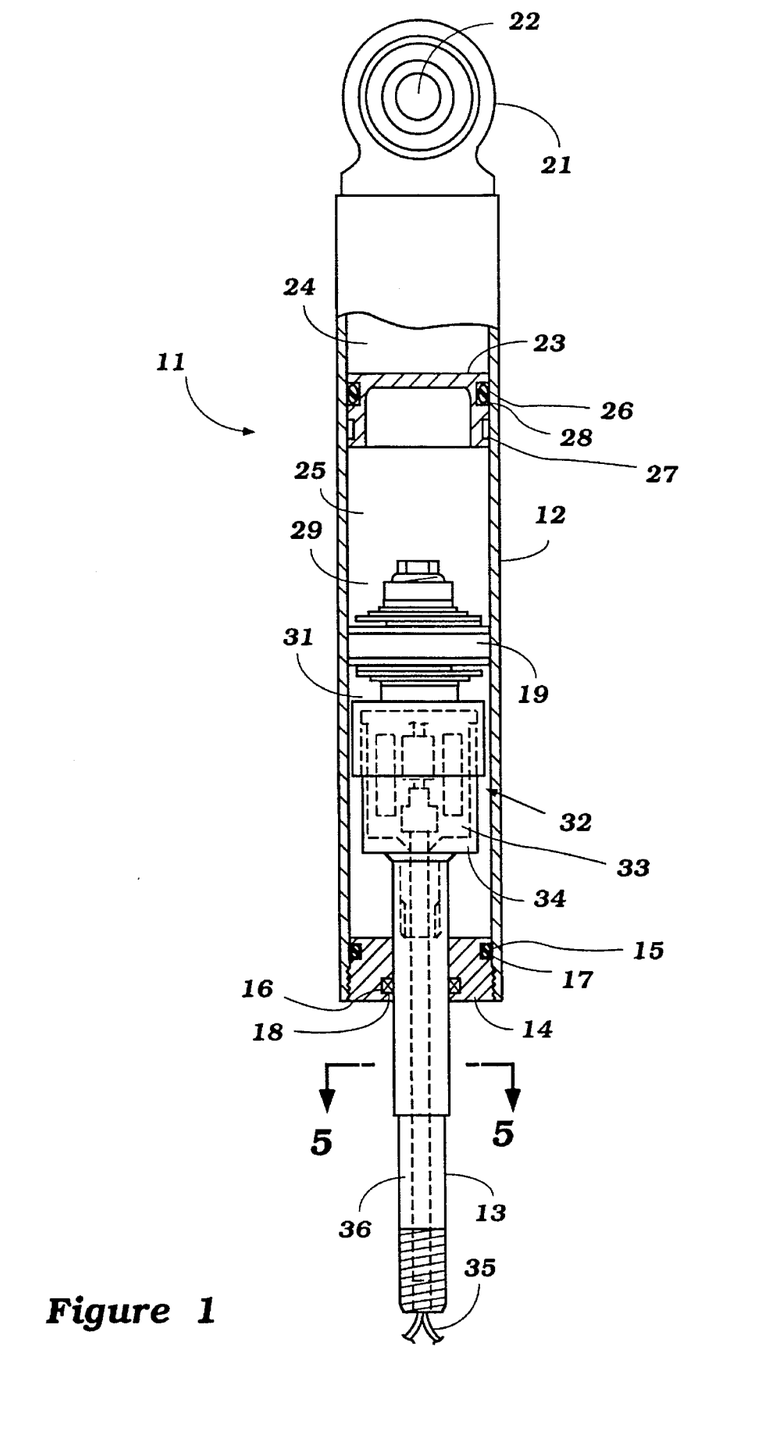
FIG. 1 is a partial section view showing the essential portions of the variable damping force hydraulic shock absorber constructed in accordance with the present invention.

Referring first to FIG. 1, a variable damping force hydraulic shock absorber constructed in accordance with this invention is shown and is identified by the reference numeral 11. The shock absorber 11 includes a cylinder 12 and a piston rod 13. The piston rod 13 is disposed in the cylinder 12 and reciprocates along the cylinder axis. The piston rod 13 is constructed with a hollow shaft and penetrates a plug member 14 located at one end of the cylinder 12. The plug member 14 preferably contains annular grooves 15 and 16 in a conventional design which allows the piston rod 13 to reciprocally move in the cylinder 12. Located within the grooves 15 and 16 are O-rings 17 and 18, respectively, to establish a fluid tight seal.

The shock absorber 11 illustrated in the accompanying figures shows the piston rod 13 and cylinder 12 orientated vertically with the piston rod 13 extending from the lower end of the cylinder 12. Accordingly, the piston rod 13 reciprocates in an upward and downward movement along the cylinder axis. It will be readily understood, however, that the shock absorber 11 can be orientated for operation in many directions. Thus, reference to the upward and downward motion or upper and lower surfaces is merely in accordance with the accompanying figures, and is not to imply any limitations to the claimed invention.

A piston 19 is reciprocally disposed in the cylinder 12 and is coupled to one end of the piston rod 13. The other end of the piston rod 13, which extends through the plug member 14, is preferably connected to a suspension member (not shown) which rotatably supports a wheel of the vehicle. The other end of the cylinder 12, distal the piston rod 13, contains a projection 21 with an opening 22 that is preferably connected to the body of a vehicle (not shown). The shock absorber 11 can also be mounted such that the end of the piston rod 13 extending from the cylinder 12 is connected to the vehicle body and the projection 21 of the cylinder 12 is connected to the suspension member of the vehicle.

Located within the cylinder 12 is a free piston 23 which separates a first chamber 24 from a second chamber 25. As known in the art, the first chamber 24 preferably contains a high pressure gas such as nitrogen, and the second chamber 25 preferably contains a fluid such as oil. The free piston 23 is slidably movable inside the cylinder 12 and it keeps the high pressure gas in the first chamber 24 from mixing with the fluid in the second chamber 25. Two annular grooves 26 and 27 are preferably located in the outer surface of the free piston 23 and an O-ring 28 may be placed in the grooves 26 or 27 to facilitate a fluid tight seal between the first and second chambers 24 and 25.

The second chamber 25 is divided into an upper fluid chamber 29 and a lower fluid chamber 31 by the piston 19. Located about the piston rod 13 and within the lower fluid chamber 31 is a solenoid driven control valve 32. The solenoid driven control valve 32 includes a solenoid case 33 which is located in a solenoid supporting member 34. Electrical power is supplied to the solenoid driven control valve 32 by electrical wires 35 that extend through a conduit 36 in the hollow piston rod 13.

Figure 2:
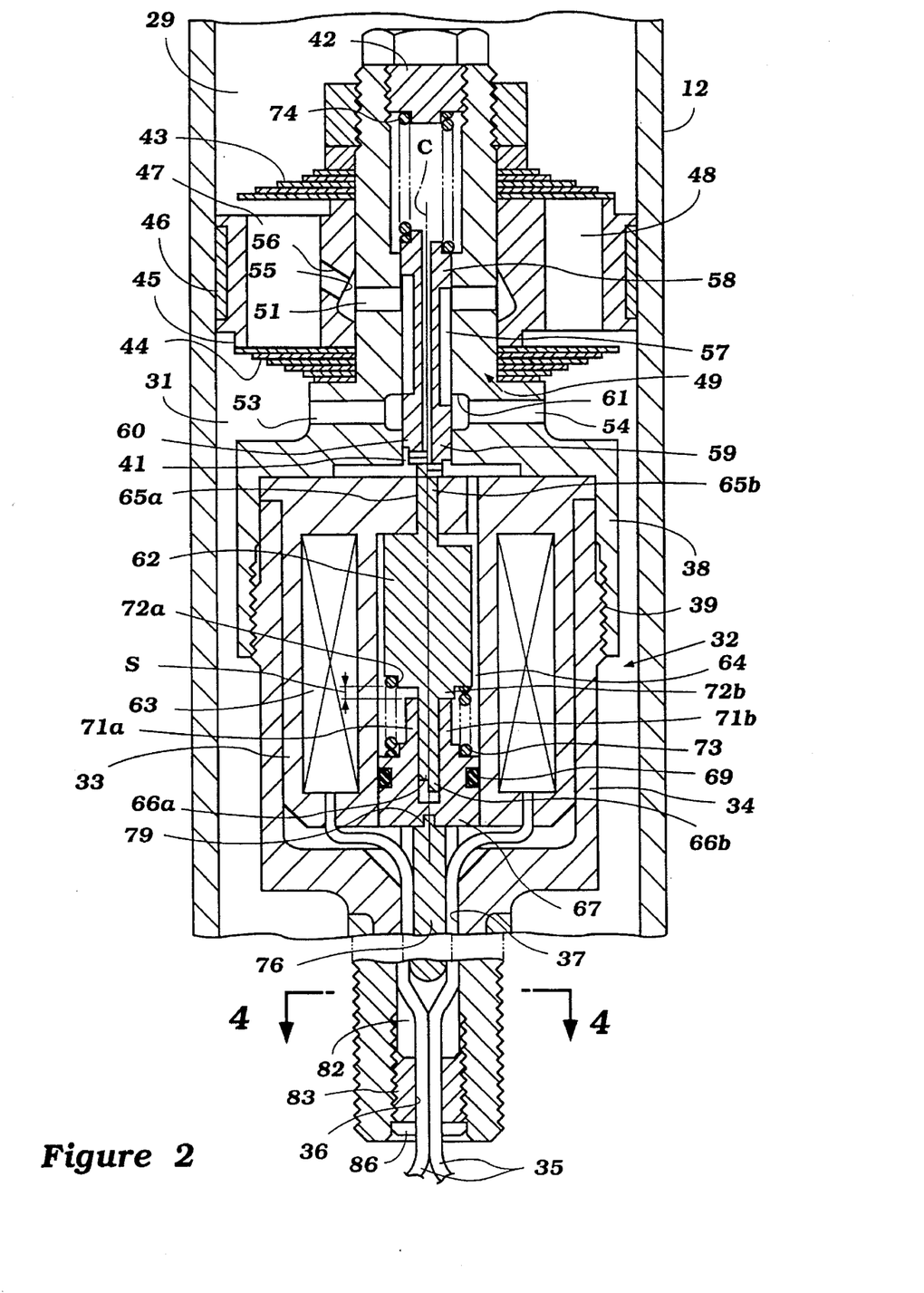
FIG. 2 is an enlarged section of the piston supporting shaft of the variable damping force hydraulic shock absorber.

As seen in FIG. 2, the lower portion of the solenoid supporting member 34 is securely attached to the piston rod 13 by means such as a threaded connection. The lower portion of the solenoid supporting member 34 has a centrally located opening 37 about the cylinder axis to connect the inner space of a solenoid supporting member 34 with the hollow shaft of the piston rod 13. The opening 37 allows the wires 35 to provide electrical power to the solenoid driven control valve 32.

Releasably connected to the solenoid supporting member 34 is a piston supporting member 38. The piston supporting member 38 is connected by means such as threaded connection 39 to the solenoid supporting member 34. The piston supporting member 38 supports the piston 19 and has a centrally located opening 41 that is located about the cylinder axis and is axially aligned with the hollow shaft of the piston rod 13 and the opening 37 to the solenoid supporting member 34. Thus, the piston rod 13, solenoid supporting member 34 and piston supporting member 38 are axially aligned about the cylinder axis. Further, the supporting members 34 and 38 move in unison according to the reciprocating motion of the piston rod 13.

The piston 19 mounted on the piston support member 38 is of a known design and structure. The resistance mechanism of the piston 19 may include a plurality of throttle plates or check valves. Preferably, the resistance mechanism includes upper throttle plates 43 and lower throttle plates 44 stacked on the respective upper and lower sides of a disk-like piston body 45. These throttle plates 43 and 44 are offset from the disk-like piston body 45 to allow fluid to flow between the chambers 29 and 31. Further, the upper and lower throttle plates 43 and 44 may allow fluid to flow at different rates to provide different resistance against the rebound and compression movements of the piston 19.

The piston 19 also has a piston ring 46 installed on the outer periphery of the disk-like piston body 45 to prevent fluid from flowing around the periphery of the piston 19. The piston ring 46 allows the piston 19 to reciprocally slide along the cylinder axis of the cylinder 12, and the throttle plates 43 and 44 resist the flow of fluid from one side of the piston 19 to the other.

The throttle plates 43 and 44 are positioned to control the fluid movement through the fluid passages 47 and 48 within the disk-like piston body 45. As seen in FIG. 2, for purposes of illustration only, the fluid passage 47 is positioned on the left side of centerline C of the cylinder axis and the fluid passage 48 is located on the right side of centerline C. The flow through the fluid passage 47 is controlled by throttle plates 44 at the lower side of the disk-like piston body 45, while the fluid passage 48 is controlled by throttle plates 43 on the upper side of the disk-like piston body 45.

In operation, when the piston rod 13 is moved upward, the fluid in the fluid passage 47 elastically deforms the throttle plates 44 located on the lower side of the disk-like piston body 45 and the fluid enters the lower fluid chamber 31. On the other hand, when the piston rod 13 moves downward, the fluid in the fluid passage 48 elastically deforms the throttle plates 43 on the upper side of the piston 19 and the fluid flows into the upper fluid chamber 29. Thus, the throttle plates 43 and 44 comprise a resistance mechanism against the reciprocating movement of the piston rod 13 because the fluid must overcome the resistance provided by the throttle plates to move from one side of the piston to the other.

The shock absorber 11 includes a control passage 49 that allows the fluid to bypass the resistance mechanism of the piston 19 when the fluid moves from one side of the piston 19 to the other. The control passage 49 includes four fluid channels 51, 52, 53 and 54 radially bored in the piston support member 38. The fluid channels 51 and 52 preferably extend perpendicular to the cylinder axis and are located between the upper throttle plates 43 and the lower throttle plates 44. Radially surrounding the exterior surface of the piston supporting member 38 is the disk-like piston body 45. Located on the inner surface of the disk-like piston body 45 is an annular groove 55. The annular groove 55 is positioned about the outer openings of the fluid channels 51 and 52 to establish fluid communication between the groove 55 and the channels 51 and 52. A communicating hole 56 is also radially bored into the disk-like piston body 45. The communicating hole 56 establishes fluid communication between the fluid passage 47 and the annular groove 55. Therefore, fluid communication is established between the fluid passage 47 and the fluid channel 51 through the communicating hole 56 and the annular groove 55.

The interior openings of the fluid channels 51 and 52, distal the annular groove 55, engage a control element or spool valve 60 which is movable along the cylinder axis. The spool valve 60 has an annular groove 57 located about its external surface. The ends of the spool valve 60 contains lans 58 and 59, respectively, that provide a fluid-tight seal between the spool valve 60 and the piston support member 38. The spool valve 60 is slidably movable along the cylinder axis within a centrally located opening 41 to the piston supporting member 38. The annular groove 57 is in fluid communication with the fluid channels 51 and 52. Located near the other end of the groove 57 is another annular groove 61, which is located in the inner surface of the piston support member 38. The annular groove 61 is positioned between the piston 19 and the solenoid supporting member 34. Radially extending from the solenoid supporting member 34, and in fluid communication with the annular groove 61 are fluid channels 53 and 54. Fluid channels 53 and 54 preferably extend perpendicular to the cylinder axis and are integrally connected to the annular groove 61. The sliding movement of the spool valve 60 allows the annular groove 57 to be selectively in fluid communication with the annular groove 61. Alternatively, the lan 59 of the spool valve 60 can block the flow of fluid between the grooves 61 and 57.

That is, the control passage 49 allows fluid passage between the upper fluid chamber 29 and the lower fluid chamber 31 which bypasses the resistance mechanism of the piston 19. For example, the fluid flowing from the upper fluid chamber 29 to the lower fluid chamber 31 during upward movement of the piston 19 as shown on the left side of centerline C, flows through the communicating hole 56, annular groove 55, fluid channel 51, groove 57, annular groove 61, fluid channel 53 and into the lower fluid chamber 31. Alternatively, during downward movement of the piston 19, in an example as seen on the right side of centerline C, the fluid may flow from the lower fluid chamber 31 to the fluid channel 54, annular groove 61, groove 57, fluid channel 52, annular groove 55, communicating hole 56 and into the fluid passage 48.

In operation, the solenoid driven control valve 32 adjusts the damping of the shock absorber 11 by controlling the fluid resistance through the control passage 49. Resistance to the fluid flow is increased or decreased by the size of the opening between the grooves 57 and 61, which depends upon the amount of overlap between the grooves 57 and 61. This overlap is adjustable because the spool valve 60 is slidably moveable within the piston supporting member 38.

In further detail, the solenoid driven control valve 32 controls the movement of the spool valve 60. The solenoid driven control valve 32 includes a control element such as a plunger 62 that is movable by increasing or decreasing the magnitude of the electrical current flowing to an annular solenoid 63. As seen in FIG. 2, the annular solenoid 63, plunger 62 and spool valve 60 are centrally located about the centerline C of the shock absorber 11. In accordance with the accompanying drawings, the view on the left side of the centerline C shows the fully energized state of the annular solenoid 63 and the right side of the centerline C shows the deenergized state of the annular solenoid 63.

The annular solenoid 63 is positioned within the solenoid case 33 and the solenoid case 63 has an upper portion constructed of a magnetic material, while the other portions of the solenoid case 33 are preferably constructed of nonmagnetic materials. The solenoid case 33 is securely held in position by the solenoid supporting member 34 and the piston support member 38. When the piston supporting member 38 is connected to the solenoid supporting member 34 by means such as threaded connection 39, a lip 60 radially extending from the upper portion of the solenoid case 33 is securely held in an interference fit between the members 34 and 38. Located within the hollow interior portion 64 of the solenoid case 33 is a cylindrical plunger 62. The solenoid 63, when energized, causes the plunger 62 to move upward as seen on the left side of FIG. 2. When the solenoid 62 is deenergized, the plunger 62 is in its initial position as shown on the right side of FIG. 2.

The plunger 62 has plunger pin 65a and 65b extending along the cylinder axis towards the piston 19 and plunger pins 66a and 66b extending from the opposing end of the plunger 62. The plunger pin 65a and 65b project through the upper portion of the solenoid case 33 towards the piston 19 and they engage the spool valve 60. The plunger pins 66a and 66b are slidably located in a central opening to plug member 67. The plug member 67 aligns the plunger pins 66a and 66b with the cylinder axis and limits the axial movement of the plunger 62. The movement of the plunger 62 is limited by extensions 71a and 71b extending from the plug member 67 that engage the protrusions 72a and 72b extending from the plunger 62.

The plug member 67 is slidably located along the cylinder axis within central opening 68 to the solenoid case 33. An O-ring 69 located on the outer periphery of the plug member 67 keeps the interior of the solenoid case 33 air tight while allowing the plug member 67 to axially slide within the solenoid case 33. The plug member 67 is preferably made of a magnetic material to enable a magnetic path be established in the base of the solenoid case 33 to intensify the magnetic force of the solenoid 63. Further, as known in the art, the solenoid 63 is preferably potted within the solenoid case 33.

Elastically interposed between the plug member 67 and the plunger 62 is a compression spring 73. The spring force of the compression spring 73 urges the plunger 62 upward. The maximum upward movement of the plunger 62, however, is limited by the upper portion of the solenoid case 33 which engages the upper surface of the plunger 62. In sum, the range of the stroke of the plunger 62 is limited by the plug member 67 and the solenoid case 33 and the distance S represents the movement of the plunger 62.

The upward movement of the plunger 62 is transferred to the spool valve 60 by the plunger pins 65a and 65b. As discussed above, the spool valve 60 is slidable along the cylinder axis and contains groove 57 which is aligned with the fluid channels 51 and 52. The spool valve 60 is also selectively aligned with annular groove 61 to permit fluid communication between the groove 57 and the annular groove 61. The amount of overlap between the groove 57 and annular groove 61 determines the size of the opening to the grooves 57 and 58 and the amount of fluid that can flow through the grooves 57 and 58. Therefore, this controls the amount of fluid flowing through the control passage 49.

The spool valve 60 engages the plunger pins 65a and 65b because of return spring 74. The return spring 74 is preferably a compression coil spring that is elastically interposed between the threaded member 42 located at the upper end of the piston supporting member 38 and the spool valve 60. The spring force of the return spring 74 is larger than that of the compression spring 73. Consequently, in the deenergized state, the return spring 74 urges the spool valve 60 downward as shown on the right side of the centerline C of FIG. 2. The spring force of the return spring 74 must be overcome in order to move the spool valve 60 upward. When the solenoid 63 is energized as shown on the left side of the centerline C, the resultant force provided by the solenoid 63 and the spring force of the compression spring 73 combine to overcome the opposing spring force of the return spring 74. This allows the plunger 62 and the spool valve 60 to move upward against the force of the return spring 74.

The position of the plunger 62 and the spool valve 60 controls the rate of fluid flowing through the control passage 49. The groove 57 on the outer periphery of the spool valve 60 is formed such that the length of the groove 57 is larger than the distance between the fluid channels 51 and 52 and the annular groove 61. When the solenoid 63 is deenergized, as shown on the right side of FIG. 2, the spool valve 60 is pushed downward by the return spring 74 such that the plunger 62 is pressed against the plug member 67 and the annular groove 61 is positioned to allow fluid communication with the fluid passage. Consequently, the damping force of the shock absorber 11 is at a minimum when the solenoid 63 is deenergized because the maximum rate of fluid flows occurs through the control passage 49. In contrast, the annular groove 61 is not aligned with the groove 57 when the maximum amount of electrical current is applied to the solenoid 63. In this case, there is no fluid flowing through the control passage 49 and the damping of the shock absorber 11 is a maximum because all the fluid flowing through the piston 19 must overcome the resistance of the throttle plates 43 and 44.

Preferably, the amount of fluid entering the control passage 49 is limited by the size of the communicating hole 56. This limits the amount of force against the spool valve 60 and the groove 57. Limiting the amount of force is desired to ensure the free movement of the spool valve 60 within the piston supporting member 38 because excessive force on the spool valve 60 may prevent the solenoid driven control valve 32 from moving the plunger 62 and spool valve 60.

A significant feature is the damping of the shock absorber 11 may be externally adjusted to a predetermined valve without changing the magnitude of the electrical current provided to the solenoid 63. This allows a constant relationship to be established between the magnitude of the electrical current provided to the solenoid 63 and damping force of the shock absorber 11. This also permits mass produced shock absorbers to be quickly and easily adjusted to provide a uniform amount of damping force.

The damping force is externally adjustable because the plug member 67 can be axially moved relative to the plunger 62 by means outside the shock absorber 11. For example, when the plug member 67 is moved toward the plunger 62, the plunger 62 is accordingly moved upward and when the plug member 67 is moved away from the plunger 62, the plunger 62 is moved downward. Consequently, this changes the degree of overlap or opening between the annular groove 61 and the groove 57. Therefore, the rate of fluid flow changes because the size of the opening in the control passage 49 has changed.

Figure 3:
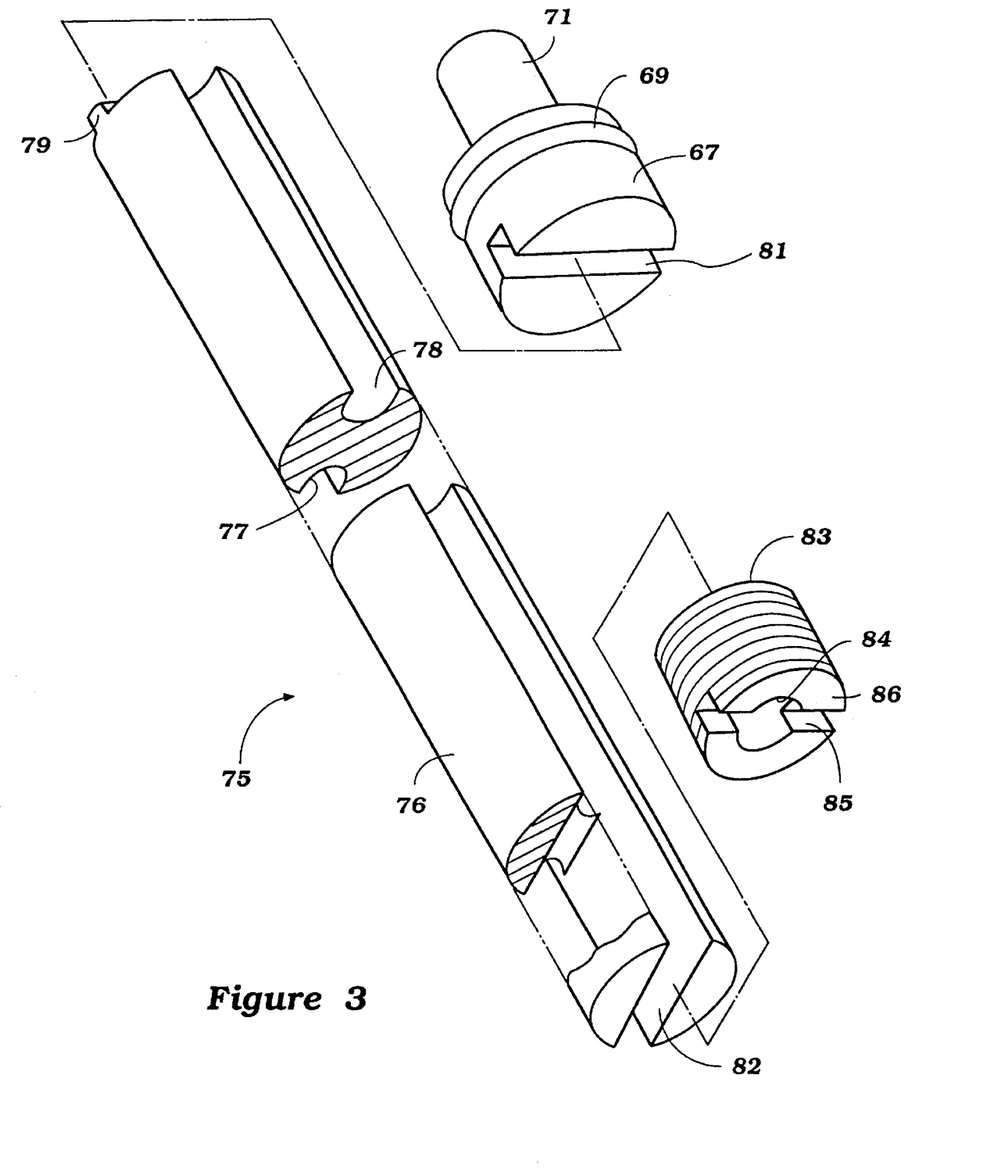
FIG. 3 is an enlarged perspective view of the adjusting rod of the variable damping force hydraulic shock absorber.

The position of the plug member 67 relative to the plunger 62 is adjusted by push rod 76. The push rod 76 is slidably movable in the hollow shaft of the piston rod 13 and is adapted to slidably engage the opening 37 to the solenoid supporting member 34. As best seen in FIG. 3, push rod 76 has two grooves 77 and 78 that are disposed opposite to each other and extend longitudinally along the outer surface of the push rod 76. A projection 79 is formed on one end of the push rod 76 and is adapted to engage corresponding slot 81 in the plug member 67. As seen in FIGS. 2 and 3, a cutout section 82 is formed at the opposing end of the push rod 76. The cutout section 82 joins the grooves 77 and 78.

The push rod 76 is inserted into the hollow shaft of the piston rod 13 such that the projection 79 engages the slot 81 of the plug member 67. The push rod 76 is secured into position by an adjusting bolt 83. The adjusting bolt 83 is preferably threadably secured to the interior surface of the hollow shaft by the piston rod 13. The adjusting bolt 83 has an aperture 84 bored along its central axis and a tool engaging groove 85 formed on the distal end 92 of the bolt 83. The tool engaging groove 85 is exposed to the open end of the hollow piston rod 13 and is adapted to engage a tool (not shown) which facilitates turning of adjusting bolt 83. This allows the position of the adjusting bolt 83 to be externally adjusted. As will be understood and appreciated to one of skill in the art, turning of the adjustment bolt 83 moves the push rod 76 into and out of the hollow shaft of the piston rod 13 and this causes the plug member 67 to move. Thus, the flow of fluid through the control passage 49 can be readily changed by turning the adjusting bolt 83.

Figure 4:
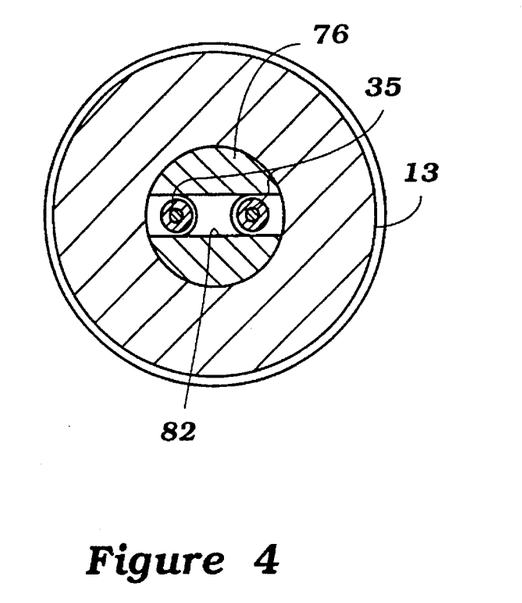
FIG. 4 is a cross-sectional view along the line 4—4 of FIG. 2.
Figure 5:
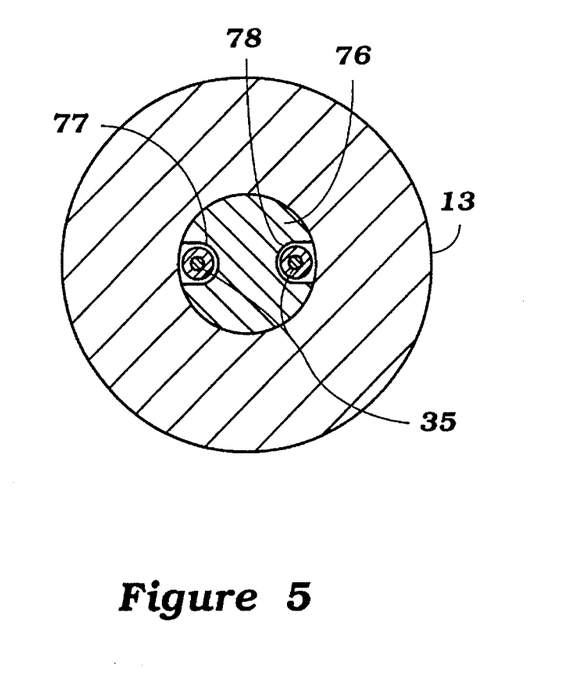
FIG. 5 is a cross-sectional view along the line 5—5 of FIG. 1.

As seen in FIG. 2, the electrical wires 35 that lead to the solenoid driven control valve 32 extend through the aperture 84 of adjusting bolt 83 and into the cutout section 82 of push rod 76. As seen in FIG. 4, in the cutout section 82, the electrical wires 35 may be adjacent to each other. However, as seen in FIG. 5, the electrical wires 35 are split in the other portion of the push rod 76 such that electrical wires 35 are located in grooves 77 and 78.

In operation of the variable damping shock absorber 11, the damping force is adjusted by screwing the adjusting bolt 83 into or out of the hollow shaft of the piston rod 13. As best seen in FIG. 2, the turning of the adjusting bolt 83 axially moves the push rod 76 within the piston rod 13. The push rod 82, which is in contact with adjusting bolt 88, is restrained from turning because of the friction of the O-ring 69. Thus, while the adjusting bolt 83 is turned or screwed into proper placement within the hollow shaft of the piston rod 13, the electrical wires 35 are not twisted because they extend through the central opening 84 of the adjusting bolt 83 and the other internal components of the shock absorber 11 do not rotate. Advantageously, rotation of the adjusting bolt 83 can occur even after the shock absorber 11 has been assembled because the bolt 83 is assessable through the open end of the hollow piston rod 13.

The push rod 76 in this embodiment is preferably formed out of a material such as an aluminum alloy. A material having a larger thermal expansion coefficient, such as magnesium alloy, can also be used as material for the push rod 76. Advantageously, when the push rod 76 is constructed from material having a larger thermal expansion coefficient, as the temperature of the fluid increases due to the heat generated from the use of the shock absorber 11, the push rod 76 correspondingly increases in size. This is a significant feature because as the temperature of the fluid increases, the viscosity of the fluid typically decreases and this decreases the amount of damping provided by the shock absorber 11. However, the enlarged push rod 76 increases the spring force of the comparison spring 73 to compensate for the decrease in viscosity. Thus, the plunger 62 moves upward and more fluid is forced through the resistance mechanism of the piston 19 decrease in velocity.

In another embodiment, the adjusting rod 75, which is disclosed as consisting of three components—the push rod 76, plug member 67 and adjusting bolt 83—may comprise a single structure. When such a single structure is employed, the electrical wires 35 for the solenoid drives control valve 32 may pass through a centrally bored hole extending along the axis of the adjusting rod 75.

Figure 6:
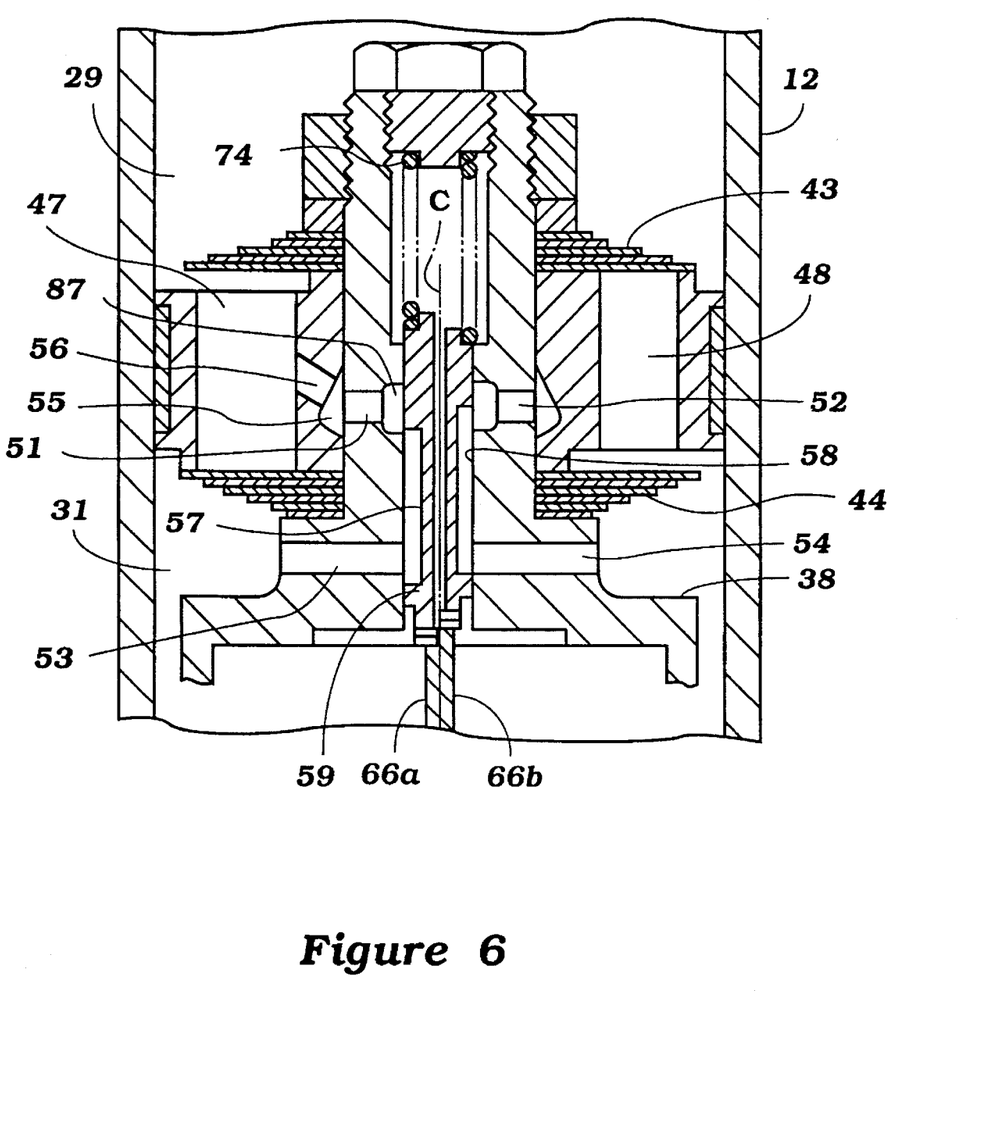
FIG. 6 is an enlarged section view of an alternative embodiment of the piston of the variable damping hydraulic shock absorber.

In yet another preferred embodiment, the control passage 49 may be closed when the solenoid 63 is deenergized to provide the maximum amount of damping force. As shown in FIG. 6, the portion of the spool valve 60 positioned on the left side of centerline C, in the deenergized state of solenoid 63, closes the opening to longitudinal groove 57 and closes the control passage 49. Thus, there is no fluid communication between the groove 57 and the annular groove 87 located in the piston supporting member 38 when the solenoid 63 is deenergized. However, when the solenoid 63 is energized, the spool valve 60 moves upward and this establishes fluid communication between the annular groove 87 and the longitudinal groove 58. This permits the rate of fluid flow to be controlled in the control passage 49 by controlling the overlap or sizes of the opening between the annular groove 87 and the groove 58. When the electrical current to the solenoid 63 reaches its maximum value, the control passage 49 is fully opened as shown on the right side of centerline C.

In the above described embodiments, the thrust force of the solenoid 63 is directed upward towards the piston 19 to control the movement of the valve body within the piston supporting member 38. In another embodiment, the thrust force of the solenoid 63 may also be directed in an opposite direction. In this alternative embodiment, the spring force of the compression spring 73 is larger than the spring force of the return spring 74 and this causes the plunger 62 to be normally located in its uppermost position with the upper surface of the plunger 62 engaging the upper portion of the solenoid case 33. In this case, the return spring 74 can be omitted by integrally forming the plunger 62 and the spool valve 60. When the solenoid 63 is energized, the plunger 62 and spool valve 60 are drawn towards the solenoid 63 and this causes the fluid flow through the groove 57 and control passage 49 to be adjusted.

Although the embodiment of the invention has been illustrated and described, it is believed to be obvious that various changes and modifications may be made without departing from the spirit and scope of the invention as defined in the appended claims.

I claim:

1. A hydraulic shock absorber comprising a cylinder with an internal space containing a fluid, a piston rod extending into said internal space, a piston fixed to said piston rod, said piston being disposed within said internal space to separate said internal space into a first fluid chamber and a second fluid chamber, said piston having a control passage for restricting the flow of fluid between said first fluid chamber and said second fluid chamber upon movement of said piston relative to said cylinder, a control element movable within said piston rod to control the fluid resistance through the control passage, a solenoid for controlling the position of said control element between a first position when fully energized and a second position when not energized, an adjustable stop for setting at least one of said control element positions, and means accessible from externally of said cylinder for mechanically adjusting said adjustable stop.

2. A hydraulic shock absorber of claim 1, wherein said control passage comprises a spool valve with an annular groove located in the exterior surface to facilitate fluid communication between the first fluid chamber and the second fluid chamber.

3. A hydraulic shock absorber of claim 1, wherein said solenoid is adjustable to various positions between said first position and said second position by providing different amounts of electrical current to the solenoid.

4. A hydraulic shock absorber of claim 1, further comprising electrical wires that extend through an aperture in the adjustable stop and a portion of the control element to provide electrical current to the solenoid.

5. A hydraulic shock absorber of claim 1, further comprising a spring located between said adjustable stop and said control element.

6. A hydraulic shock absorber of claim 1, wherein said control element is constructed of a thermally responsive material.

7. A hydraulic shock absorber of claim 1, wherein said adjustable stop comprises an adjusting bolt threadably connected within the piston rod.

8. A hydraulic shock absorber of claim 7, further comprising a slot located in one end of said adjusting bolt that is externally accessible of said shock absorber to permit mechanical adjustment of said adjusting bolt.

9. A hydraulic shock absorber of claim 8, wherein said adjusting bolt has a centrally located opening through which electrical wires can pass.

10. A hydraulic shock absorber of claim 1, wherein said control element comprises a push rod and a plunger adjustably located within the piston rod.

11. A hydraulic shock absorber of claim 10, wherein said push rod is constructed of a thermally responsive material.

12. A hydraulic shock absorber of claim 10, wherein said push rod contains two grooves in its exterior surface such that electrical wires may be contained within the grooves.

13. A hydraulic shock absorber of claim 12, wherein said electrical wires pass through an aperture in the adjusting bolt and the grooves in the push rod to provide electrical current to the solenoid.

14. A hydraulic shock absorber of claim 10, further comprising a spring located between the push rod and the plunger.

15. A hydraulic shock absorber of claim 7, wherein the adjusting bolt is moveable within the piston rod such that the movement of the adjusting bolt correspondingly moves the push rod and plunger to control the fluid resistance of the control passage.

16. A hydraulic shock absorber of claim 1, wherein said control element further comprises a push rod, said push rod adapted to engage a plug member, a plunger movable by said solenoid, a spring located between and engaging said plug member and said plunger, a valve body to facilitate fluid communication between the first fluid chamber and the second fluid chamber, and said plunger adapted to engage said valve body.

17. A hydraulic shock absorber of claim 16, wherein said adjustable stop engages said push rod and moving said adjustable stop causes corresponding movement of the push rod, plug member, spring, plunger and valve body such that the fluid resistance through the control passage is controlled.

* * * * *